Figure 1:
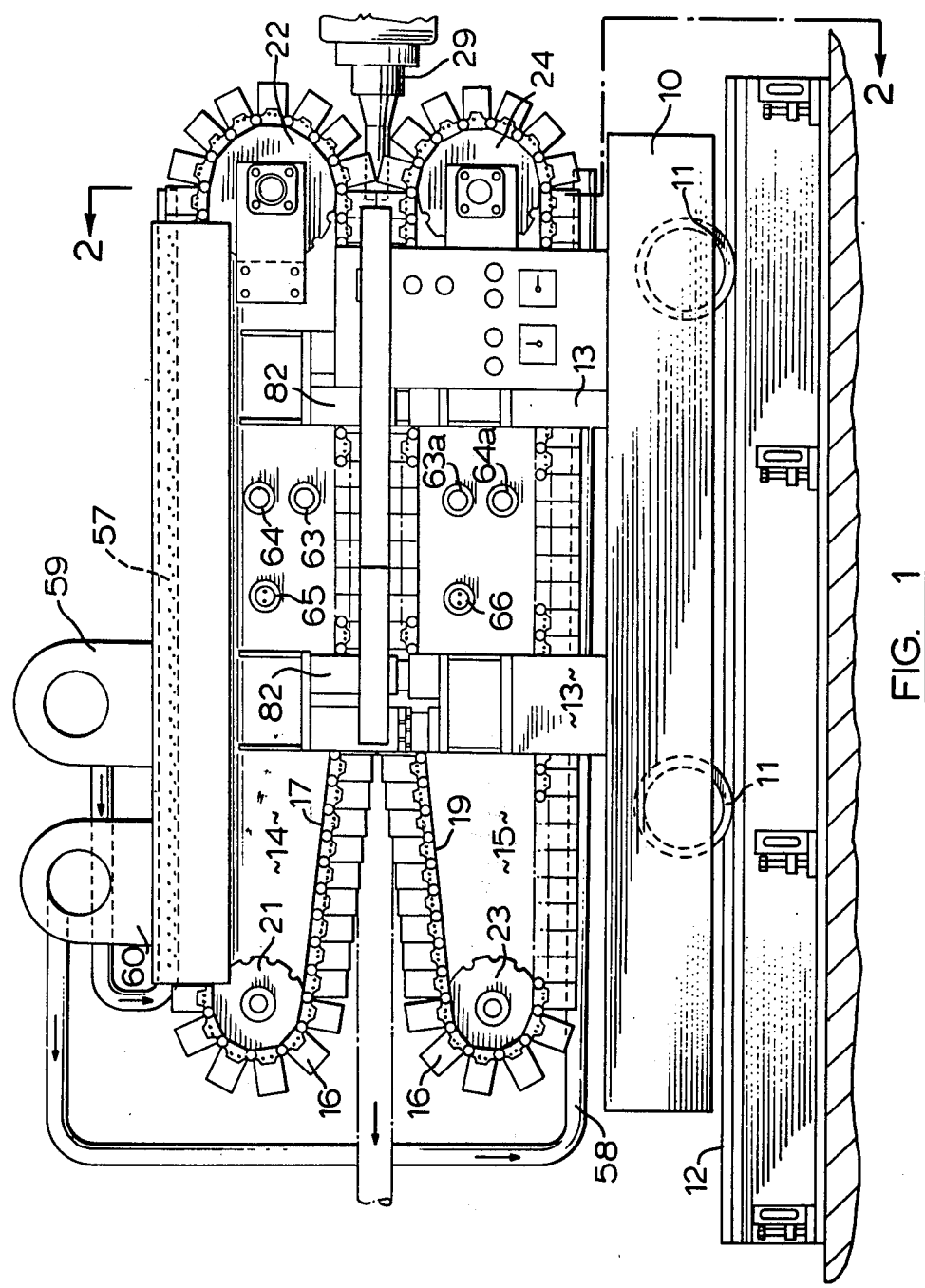

United States Patent [19]

Lupke et al.

[11] 4,165,214
[45] Aug. 21, 1979

[54] APPARATUS FOR PRODUCING CORRUGATED THERMOPLASTIC TUBING

[76] Inventors: Gerd P. H. Lupke, 46 Stornoway Crescent; Manfred A. A. Lupke, 35 Ironshield Crescent, both of Thornhill, Ontario, Canada

[21] Appl. No.: 865,019

[22] Filed: Dec. 21, 1977

[30] Foreign Application Priority Data

Sep. 13, 1977 [CA] Canada .................................. 286652

[51] Int. Cl.$^2$ ............................................. B29D 23/03
[52] U.S. Cl. .................................. 425/532; 425/539; 425/393; 425/812
[58] Field of Search .............................. 264/89, 95, 99; 425/327, 72 R, 371, 812, 387.1, 404, 445, 326.1, 392, 393, 396, 539, 532, 540

[56] References Cited

U.S. PATENT DOCUMENTS

| | | | |
|---|---|---|---|
| 3,677,676 | 7/1972 | Hegler | 425/380 X |
| 3,924,992 | 12/1975 | Hegler | 425/539 X |
| 3,981,663 | 9/1976 | Lupke | 425/326.1 |
| 4,003,685 | 1/1977 | Maroschak | 425/532 X |

FOREIGN PATENT DOCUMENTS

47-34825  9/1972  Japan ...................................... 425/326.1

*Primary Examiner*—Mark Rosenbaum
*Attorney, Agent, or Firm*—Ridout & Maybee

[57] ABSTRACT

In order, in the molding of corrugated thermoplastic tubing, to overcome the disadvantage that pressurized air which is supplied to a zone within the tube of thermoplastic material as it is extruded from an extrusion head into the entrance of a tubular mold tunnel may tend to cause rupturing of the tube at the area immediately adjacent to the extrusion head where the tube is unsupported by the wall of the tubular mold tunnel the pressurized gas is supplied at a low pressure to a first zone within the tube of thermoplastic material to support the tube against the wall of the tunnel, and pressurized gas at different, successively higher pressures is supplied to second and third zones within the tube to urge the tube outwardly into the corrugations of the tubular mold tunnel. A gas leakage path between the second and third zones permits leakage from the third to the second zone, the pressure in the second zone being controlled by venting gas therefrom at a controlled rate.

5 Claims, 3 Drawing Figures

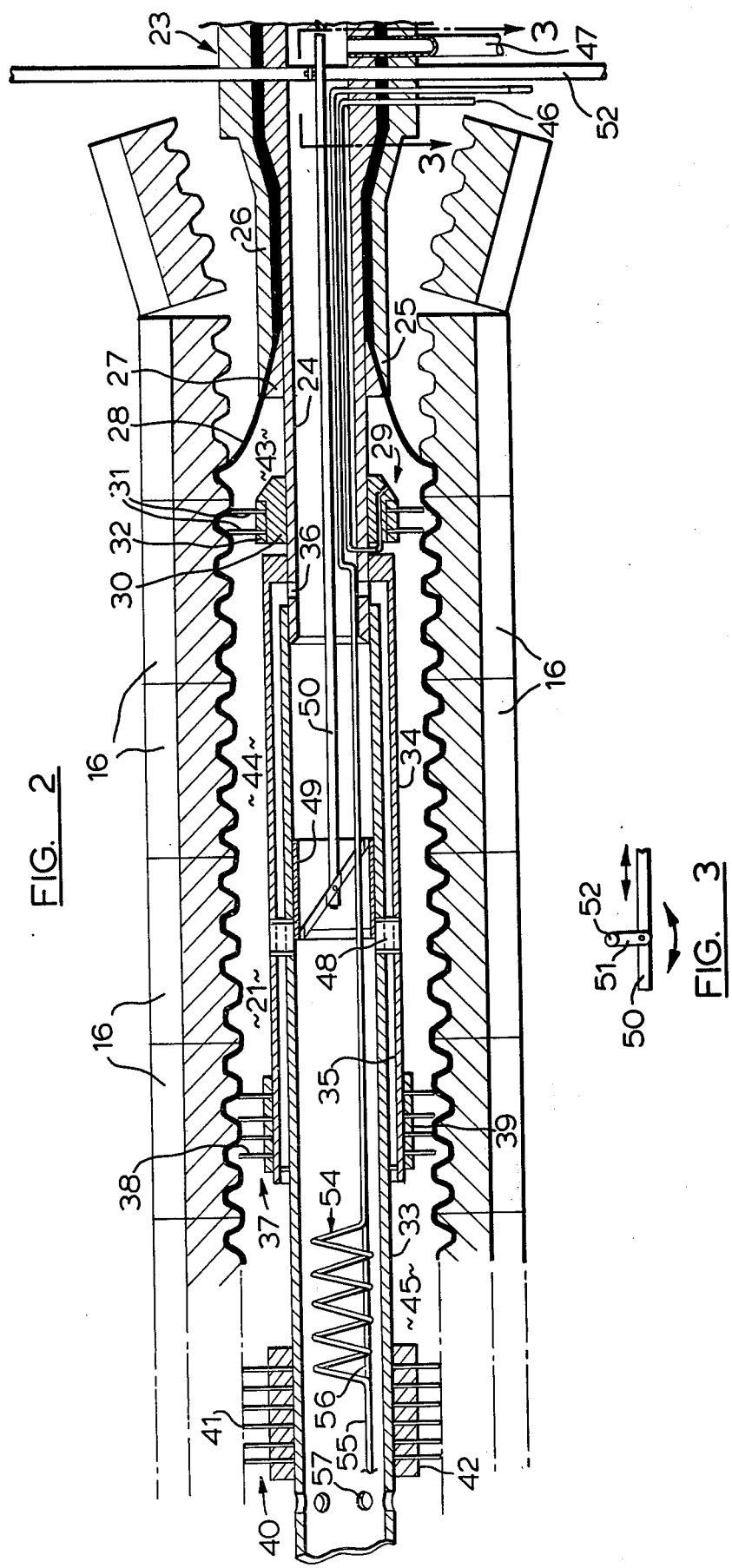

APPARATUS FOR PRODUCING CORRUGATED THERMOPLASTIC TUBING

This invention is concerned with apparatus for producing corrugated thermoplastic tubing, and more particularly with such apparatus which is of the type comprising a pair of complementary mold assemblies each of which has an endless array of articulately interconnected mold blocks, and drive means for driving the mold blocks in synchronism along a forward run in which the mold blocks of the mold assemblies are in cooperative interengagement to provide an axially extending tubular mold tunnel having a corrugated wall, and back along a return run. An extrusion head is disposed at the entrance to the tubular mold tunnel for forming a tube of thermoplastic material, and gas supply means is provided for supplying pressurized gas to dispose the tube of thermoplastic material against the corrugated wall of the tubular mold tunnel.

It is a disadvantage of known apparatus of the type described above that, during the production of corrugated thermoplastic tubing using the apparatus, there can be a tendency for the pressurized gas which is supplied by the gas supply means to cause rupturing of the tube of thermoplastic material at the area immediately adjacent to the extrusion head where the tube is unsupported by the wall of the tubular mold tunnel, the thermoplastic material of the tube in this area being of course at a high temperature and hence being relatively soft.

In our copending patent application Ser. No. 770,664 filed Feb. 22, 1977 and entitled "Apparatus for and Method of Producing Corrugated Thermoplastic Tubing", there is described a method of overcoming the above-mentioned disadvantage by supplying the gas at different pressures to respective first and second zones within the tube of thermoplastic material whereby to support the tube against the cooperatively interengaged mold blocks within the first zone and thereafter to urge the tube outwardly into the corrugations in the wall of the tubular mold tunnel within the second zone. In this way the relatively soft thermoplastic material as it is extruded from the extrusion head is subjected only to a relatively low gas pressure, sufficient to support the tube, full molding pressure being applied subsequently.

The present invention relates to an improvement in the invention described in the above-identified application, wherein the gas is supplied at successively increasing pressures to successive first, second and third pressurizable zones within the thermoplastic tube, the gas in the second zone being supplied by leakage from the third zone and maintained at an intermediate pressure by vent means communicating with the second zone. In a preferred embodiment of the invention, the gas vented from the second zone is cooled and distributed to the thermoplastic material downstream from the third zone to cool the material.

Thus, according to one aspect of the present invention, an apparatus of the type hereinbefore specified comprises a plurality of gas sealing arrangements mounted within the tubular mold tunnel in axially spaced relationship, said gas sealing arrangements cooperating with said tube of thermoplastic material to define successive first, second and third pressurizable zones therein, gas supply means for supplying pressurized gas at a first pressure to the first zone for supporting the tube against the tunnel wall, and for supplying pressurized gas at different, successively greater, pressures to the second and third zones for urging the tube of thermoplastic material outwardly into the corrugations in the wall of the mold tunnel, means defining a gas leakage path between said second and third zones to permit leakage of gas from the third zone to the second zone, and vent means communicating with the second zone for controlling the exhaust of gas therefrom to maintain the gas pressure in the second zone less than the gas pressure in the third zone by a controlled amount.

According to another aspect of the present invention, in a method of producing corrugated thermoplastic tubing which comprises extruding a tube of thermoplastic material and directing the tube into the entrance of an axially extending, corrugated-walled, tubular mold tunnel formed by cooperatively interengaging mold blocks driven in synchronism along a forward run, and supplying pressurized gas at successively increasing pressures to successive first, second and third pressurizable zones within the tube of thermoplastic material in the mold tunnel to support the tube against the cooperatively interengaging mold blocks in the first zone and to urge the tube outwardly into the corrugations in the wall of the mold in the second and third zones, the gas pressure in the second zone is maintained intermediate between the gas pressures in the first and third zones by permitting a leakage of pressurized gas from the third zone to the second zone while venting gas from the second zone at a controlled rate.

In order that the invention may be readily understood and readily carried into effect the same will now, by way of example, be more fully described with reference to the accompanying drawings in which:

FIG. 1 is a side view of apparatus according to a preferred embodiment of the invention; and FIG. 2 is a vertically sectioned view, on an enlarged scale, of a portion of the apparatus shown in FIG. 1; and FIG. 3 is a section on line 3—3 in FIG. 2.

Referring to the drawings and in particular to FIG. 1 thereof, the apparatus according to the preferred embodiment of the invention comprises a wheeled structure including a carriage 10 having wheels 11 which run on tracks 12. A support structure 13 which is mounted on the carriage 10 supports a pair of complementary upper and lower mold assemblies 14 and 15, respectively, each mold assembly 14 and 15 comprising an endless array of articulately interconnected mold blocks 16. The mold assembly 14 further comprises a pair of transversely spaced endless conveyor chains (only one of which is shown in the drawings and is denoted by the reference numeral 17), with each mold block 16 of the assembly 14 extending transversely between opposed lengths of these chains. The mold assembly 15 likewise further comprises a pair of endless conveyor chains (only one of which is shown in the drawings and is denoted by the reference numeral 18), with each mold block 16 of the assembly 15 extending transversely between opposed lengths of this pair of chains including the chain 18. The chains are entrained around drive sprockets 19 and 20, with drive means (not shown) being connected to at least one of the sprockets 19 and to at least one of the sprockets 20 for operatively driving the mold blocks 16 of each assembly 14 and 15 in synchronism along a forward run and back along a return run, the mold blocks 16 of the assemblies 14 and 15 being, in the forward runs, in cooperative interengagement to define an axially extending tubular mold tunnel 21 having a corrugated wall (FIG. 2).

The support structure 13 includes mechanical jacks 22 interconnecting the upper and lower mold assemblies 14 and 15 and operable for raising the upper assembly 14 from the lower assembly 15, when required, to permit easy access for servicing.

By means of the wheeled carriage 10 the mold assemblies 14 and 15 are operatively positioned to locate an extrusion head 23 at the entrance to the tubular mold tunnel 21, the extrusion head 23 being operatively coupled to the nozzle of an extrusion machine (not shown) which may be of conventional form. If required, the mold assemblies 14 and 15 can be moved away from the extrusion head 23 by movement of the wheeled carriage 10 along the tracks 12, in order to provide access to the extrusion head 23.

Referring now particularly to FIG. 2, the extrusion head 23 comprises an inner tubular member 24 which is coaxial with the tubular mold tunnel 21, and an outer tubular member 25 disposed coaxially therewith, the extrusion head being operatively coupled to the nozzle of the extrusion machine (not shown) in the manner described in the afore-mentioned application. Thermoplastic material such as, for example, polyvinyl chloride or polypropylene operatively flows from the nozzle of the extrusion machine to the extrusion head, and through the annular space between the inner and outer tubular members 24 and 25, the thermoplastic material being extruded through the space formed between a tapered end portion 26 of the outer tubular member 25 and a frusto-conical member 27 which is mounted on the inner tubular member 24, to form a tube 28 of the thermoplastic material at the entrance of the tubular mold tunnel 21. The member 27 is screw-threadedly mounted on the inner tubular member 24 to permit axial adjustment of the member 27 thereby to change the thickness of the tube 28 which is extruded.

Mounted on the inner tubular member 24 is a first sealing arrangement 29 which comprises a collar 30 and a plurality of axially spaced annular discs 31, these annular discs being mounted on the collar and fixedly clamped between clamping rings 32. The annular discs 31 are of a resiliently deformable material such as, for example, a silicon rubber.

Also mounted on the inner tubular member 24 adjacent its forward end are a pair of coaxially extending tubular members 33 and 34 disposed one within the other, these members defining an annular space 35 which communicates at its rearward end with the interior of the tubular member 24 via ports 36. A second sealing arrangement 37 is mounted on the forward end of the member 34; this second sealing arrangement comprises a plurality of axially spaced annular discs 38 of resiliently deformable material, such as silicon rubber, mounted on the member 34 and clamped at their inner peripheries between clamping rings 39. A third sealing arrangement 40 is mounted on the tubular member 33. This third sealing arrangement also comprises a plurality of axially spaced annular discs 41 of resiliently deformable material clamped at their inner peripheries between clamping rings 42. The outer peripheries of the discs 31, 38 and 41 engage the internal surface of the extruded tube 28, forming a gas seal therewith, the sealing arrangements cooperating with the tube 28 of thermoplastic material to define successive first, second and third pressurizable zones 43, 44 and 45. Pressurized gas, which may be air, is supplied at a first pressure to the first zone 43 via a duct 46 which is led through the wall of the extrusion head 23 and extends within the inner tubular member 24, terminating at an opening formed in the collar 30 and communicating with the pressurizable zone 43. The gas pressure in the zone 43 is just sufficient to support the tube 28 against the corrugated wall formed by the mold blocks 16. Gas is also supplied to the third pressurizable zone 45 at a considerably higher pressure from an independent source, the gas being supplied via a pipe 47 extending through the wall of the extrusion head 23; this gas at higher pressure passes from the interior of the tubular member 24 via the ports 36 in the annular space 35, which communicates with the third pressurizable zone at its forward end. The discs 38 of the second gas sealing arrangement 37 are constructed so as to permit leakage of pressurized gas from the third zone 45 to the second zone 44, the gas being vented from the second zone at a controlled rate via ports 48 so as to maintain the gas pressure in the second zone intermediate between the gas pressures in the first and third zones The tubular member 33 constitutes a vent duct communicating with the second pressurizable zone 44 by the ports 48. The rate at which the gas is vented from the pressurized zone 44 is controlled by means of a valve constituted by a piston 49 which is slidably mounted within the tubular member 33 and longitudinally adjustable to control the effective area of the ports 48. The piston 49 is connected to an axially extending rod 50, a detail of which is shown in FIG. 3, the rod being pivotally connected to one end of a crank arm 51 extending from a manually rotatable shaft 52 extending transversely through the extrusion head 23.

Heat exchange coils, one of which is shown at 54, are disposed along the interior of the tubular duct 33 and supplied with coolant, supply and return pipes for the coolant being shown at 55, 56. Thus, air vented from the pressurized zone 44 via the ports 48 is cooled by the heat exchangers 54 and is distributed via openings 57 in the duct 33 to the molded thermoplastic material which is downstream from the third sealing arrangement 40.

What we claim is:

1. Apparatus for producing corrugated thermoplastic tubing, the apparatus comprising a pair of complementary mold assemblies each having an endless array of articulately interconnected mold blocks, drive means for driving the mold blocks in synchronism along a forward run in which the mold blocks of the mold assemblies are in cooperative interengagement to provide an axially extending tubular mold tunnel having a corrugated wall, and back along a return run, an extrusion head disposed at the entrance to the tubular mold tunnel for forming a tube of thermoplastic material, a plurality of gas sealing arrangements mounted within the tubular mold tunnel in axially spaced relationship, said gas sealing arrangements cooperating with said tube of thermoplastic material to define successive first, second and third pressurizable zones therein, gas supply means for supplying pressurized gas at a first pressure to the first zone for supporting the tube against the tunnel wall, and for supplying pressurized gas at different, successively greater, pressures to the second and third zones for urging the tube of thermoplastic material outwardly into the corrugations in the wall of the mold tunnel, means defining a gas leakage path between said second and third zones to permit leakage of gas from the third zone to the second zone, and vent means communicating with the second zone for controlling the exhaust of gas therefrom to maintain the gas pressure in the second zone less than the gas pressure in the third zone by a controlled amount.

2. Apparatus according to claim 1, said vent means including a duct extending to the second zone and having a valve controlled port communicating therewith.

3. Apparatus according to claim 2, each of said sealing arrangements comprising a plurality of axially spaced disc members positioned to cooperate with the thermoplastic tube at their peripheries.

4. Apparatus according to claim 3, including a tubular member connected to and extending axially from said extrusion head along said mold tunnel, the disc members being fixedly secured on the tubular member, and the tubular member defining an interior gas passage constituting said duct.

5. Apparatus according to claim 4, including heat exchange means mounted within said duct, and means for circulating coolant through said heat exchange means, said duct providing openings for distributing cooled gas to the thermoplastic tube downstream from said third sealing arrangement.

* * * * *